(12) United States Patent
Sperisen et al.

(10) Patent No.: US 8,323,398 B2
(45) Date of Patent: *Dec. 4, 2012

(54) CONSTRUCTION MATERIAL BASED ON ACTIVATED FLY ASH

(75) Inventors: Thierry Sperisen, Port (CH); Javier Vasquez-Favela, Orpund (CH); Hugo Bolio-Arceo, San Pedro Garza Garcia (MX)

(73) Assignee: Cemex Research Group AG, Brügg (CH)

( * ) Notice: Subject to any disclaimer, the term of this patent is extended or adjusted under 35 U.S.C. 154(b) by 148 days.

This patent is subject to a terminal disclaimer.

(21) Appl. No.: 12/673,542

(22) PCT Filed: Aug. 17, 2007

(86) PCT No.: PCT/IB2007/002377
§ 371 (c)(1),
(2), (4) Date: Jun. 14, 2010

(87) PCT Pub. No.: WO2009/024829
PCT Pub. Date: Feb. 26, 2009

(65) Prior Publication Data
US 2011/0259245 A1  Oct. 27, 2011

(51) Int. Cl.
C04B 14/04 (2006.01)
(52) U.S. Cl. ........ 106/600; 106/705; 106/707; 106/737; 106/738; 106/789; 106/DIG. 1
(58) Field of Classification Search .................. 106/600, 106/705, 707, 737, 738, 789, DIG. 1
See application file for complete search history.

(56) References Cited

U.S. PATENT DOCUMENTS

| | | | | |
|---|---|---|---|---|
| 4,642,137 A | * | 2/1987 | Heitzmann et al. | 106/607 |
| 4,761,183 A | | 8/1988 | Clarke | |
| 5,342,445 A | * | 8/1994 | Kiyomoto et al. | 106/789 |
| 5,435,843 A | | 7/1995 | Roy et al. | |
| 5,482,549 A | * | 1/1996 | Blaakmeer et al. | 106/606 |
| 5,515,921 A | | 5/1996 | Cowan et al. | |
| 5,565,028 A | | 10/1996 | Roy et al. | |
| 5,601,643 A | * | 2/1997 | Silverstrim et al. | 106/624 |
| 6,149,724 A | | 11/2000 | Ulibarri et al. | |
| 6,470,812 B1 | | 10/2002 | Arroyave-Garcia et al. | |

(Continued)

FOREIGN PATENT DOCUMENTS
EP  0 858 978  8/1998
(Continued)

OTHER PUBLICATIONS

Škvára, František et al: "Chemical Activation of Substances with Latent Hydraulic Properties;" Ceramics—Silikáty, Prague, CZ, vol. 43, No. 3, 1999, XP008070553, ISSN: 082-5468.

(Continued)

*Primary Examiner* — Paul Marcantoni
(74) *Attorney, Agent, or Firm* — Harness, Dickey & Pierce, P.L.C.

(57) ABSTRACT

The disclosure concerns cost effective concrete formulations based on an alkali activated binder. The construction material of the concrete type, contains sand, fine aggregates, coarse aggregates, water and a binder comprising:

from 55 to 80 wt. % of fly ash containing less than wt. 8% of CaO;
from 15 to 40 wt. % of blast furnace slag;
a chemical activator containing:
  from 0.8 to 4 wt. % of alkaline silicates; and
  from 1.5 to 9 wt. % of alkaline carbonates;
  wherein the chemical activator has an silica to alkali molar ratio from 0.1 to 0.55; and
a booster comprising at least one strong base.

The disclosure also concerns a method to produce such a concrete construction material.

13 Claims, 3 Drawing Sheets

| | $SiO_2$ | $Al_2O_3$ | $CaO$ | $Fe_2O_3$ | $K_2O$ | $Na_2O$ | $MgO$ | $SO_3$ | $Mn_2O_3$ | $TiO_2$ | $P_2O_5$ | LOI |
|---|---|---|---|---|---|---|---|---|---|---|---|---|
| FA | 41.69 | 25.70 | 6.15 | 19.93 | 1.24 | 0.00 | 1.13 | 0.37 | 0.10 | 1.13 | 0.36 | 0.66 |
| BFS | 34.41 | 12.26 | 41.16 | 0.31 | 0.31 | 0.10 | 5.98 | 2.58 | 0.39 | 1.35 | 0.00 | 0.00 |

U.S. PATENT DOCUMENTS

| | | |
|---|---|---|
| 6,488,765 B1 | 12/2002 | Tseng et al. |
| 6,688,883 B2 | 2/2004 | Tseng et al. |
| 7,001,454 B2 | 2/2006 | Lopez-Gonzales et al. |
| 7,288,148 B2 | 10/2007 | Hicks et al. |
| 7,341,105 B2 | 3/2008 | Bingamon et al. |
| 7,527,688 B2 | 5/2009 | Bingamon et al. |
| 7,727,330 B2 * | 6/2010 | Ordonez et al. .............. 106/707 |
| 2004/0121140 A1 | 6/2004 | Ramirez Tobias et al. |
| 2004/0231566 A1 | 11/2004 | Wang et al. |
| 2005/0172865 A1 | 8/2005 | Sadikovic |
| 2005/0284347 A1 | 12/2005 | Forster et al. |
| 2008/0092781 A1 | 4/2008 | Ramirez Tobias et al. |
| 2009/0217844 A1 | 9/2009 | Ordonez et al. |
| 2011/0271876 A1 * | 11/2011 | Alter et al. .................... 106/707 |

FOREIGN PATENT DOCUMENTS

| | | |
|---|---|---|
| WO | WO 99/67183 | 12/1999 |
| WO | WO 2005/075374 | 8/2005 |
| WO | WO 2005/097700 | 10/2005 |

OTHER PUBLICATIONS

Xu, H. et al.; "The Actvaton of Class C-, Class F-Fly Ash and Blast Funace Slag Usng Geopolymerisation;" Eighth CANMET/ACI International Conference on Fly Ash, Silica Fume, Slag and Natural Pozzolans in Concrete, SP-221-49, Las Vegas, Nevada, held on May 23-29, 2004; pp. 797-820.

* cited by examiner

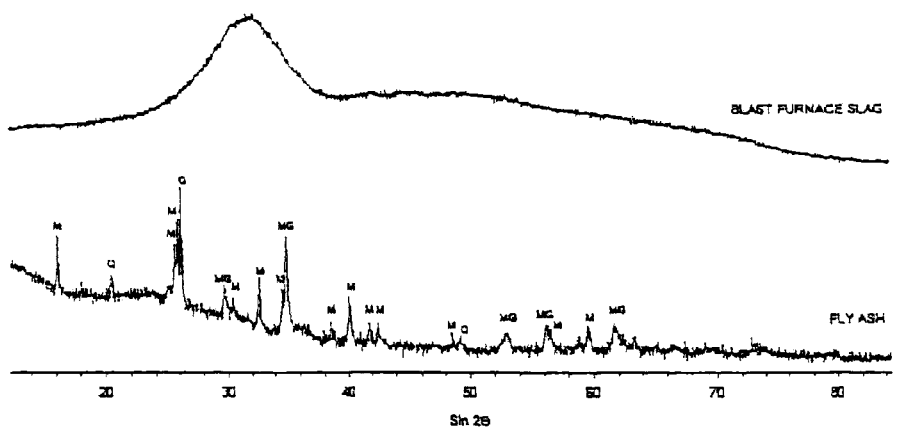

|  | Example 1 EB22 | Example 2 EB79 | Example 3 EB56 | Example 4(*) EB33 | Example 5 EB8 | Example 6 EB34(*) |
|---|---|---|---|---|---|---|
| Fly ash [w%] | 70.45 | 62.71 | 67.76 | 66.40 | 66.03 | 66.26 |
| Blast furnace slag [w%] | 23.48 | 33.77 | 29.04 | 28.46 | 28.30 | 28.40 |
| SiO2 (silicates) [w%] |  |  |  |  |  |  |
| R2O (carbonates) [w%] | 1.88 | 1.09 | 1.09 | 1.42 | 2.36 | 1.89 |
| SiO2/R2O molar | 4.19 | 2.43 | 2.11 | 3.72 | 3.32 | 3.45 |
|  | 0.38 | 0.42 | 0.48 | 0.38 | 0.48 | 0.38 |
| Binder content [Kg/m3] | 500 | 500 | 500 | 500 | 500 | 400 |
| Water/Binder | 0.4 | 0.35 | 0.35 | 0.35 | 0.4 | 0.4 |
| pH final | 13 | 13 | 13.375 | 13 | 12.5 | 13.1 |
| Strong bases concentration [Mol] | 0.5 | 0.35 | 0.64 | 0.25 | 0.07 | 0.28 |
| Slump [cm] | 21-23 | 5-7 | 20-22 | 16-18 | 8-10 | 15-17 |
| Resistance at 2 days [Mpa] | 11.7 | 13.1 | 21 | 27.3 | 12.1 | 19.5 |
| Resistance at 7 days [Mpa] | 34.5 | 32.7 | 34.5 | 46.8 | 28.6 | 43.5 |
| Resistance at 28 days [Mpa] | 43.7 | 40.6 | 45.9 | 59.7 | 37.2 | 55.7 |

Table 3: Some examples of concrete mix designs according to the invention and related measured properties
* Specific surface 500 m2/Kg (Blaine 5000)

FIG. 4

CONSTRUCTION MATERIAL BASED ON ACTIVATED FLY ASH

CROSS-REFERENCE TO RELATED APPLICATIONS

This application is a National Phase Entry of International Application No. PCT/IB2007/002377, filed on Aug. 17, 2007, which is incorporated by reference herein.

TECHNICAL FIELD

The present invention concerns concrete formulations based on an alkali activated binder with no cement or clinker additions (mixtures of fly ashes and slags) that provides strength development and workability similar to ordinary Portland cement based concretes.

BACKGROUND OF THE INVENTION

Fly ash is a by-product of burning coal, typically generated during the production of electricity at coal-fired power plants. Fly ashes are mainly composed by aluminosilicates partially vitrified, as well as mineral phases such as quartz, hematite, maghemite, anhydrite and so on which had been present as impurities in the original coal. ASTM C 618-85 ("Standard specification for fly ash and raw calcinated natural pozzolan for use as a mineral admixture in Portland cement concrete") has classified fly ash into two classes, Class C and Class F, depending on the total sum of silica, alumina and ferric oxide present. Class F contains more than 70% of the above oxides and Class C contains less than 70% but more than 50%. Class F fly ash is typically low in calcium oxide (<8%) whereas Class C has a higher content being sub-classified in two categories: Class CI (8-20% CaO) and Class CH (>20% CaO). Therefore, Class F fly ash is not usually considered as a cementitious material by itself because, due to its low calcium oxide content, it cannot be agglomerated after hydration to produce bonding strength in the final product, contrary to Class C fly ash.

Fly ash is a by-product that has to be used and consumed to reduce its environmental impact. Nowadays, it has mainly been used as a partial substitute in ordinary Portland cement due to its pozzolanic reactivity. However, there is a limitation in the replaced quantity because the pozzolanic reaction rate is very low at room temperature causing initial low strength and fast neutralization.

Recently trials have been carried out to increase the pozzolanic reaction rate by using activators such as alkaline and alkaline earth compounds (ROH, R(OH)$_2$), salts from weak acids (R$_2$CO$_3$, R$_2$S, RF) and silicic salts type R$_2$O(n)SiO$_2$, where R is an alkaline ion from Na, K or Li. However, either the activation efficiency is not enough or there are some undesired interactions between ordinary Portland cement and activators, which causes rheological and/or mechanical problems. This fact promotes the use of additional components, mainly admixtures, which increases the complexity of the formulation and makes worse the technological development of these products.

The high amount of lime CaO in fly ash type C provides the waste product with intrinsic cementitious properties. On the other hand, fly ash type F does not by itself develop any strength on hydration, and an activation of the product is requested to ensure that strength development will take place on hydration. A major advantage to prefer fly ash type F rather than fly ash type C is the high availability in large quantities of fly ash type F and its lower market price. Since transportation costs of industrial wastes would be a key issue for the cost effectiveness of the final product or binder, the selection of fly ash type F is guided by its availability in large quantities and its dense geographic distribution.

For many years, many formulations and processes have been proposed to activate fly ash or industrial wastes in order to use it as a cementitious material. U.S. Pat. Nos. 5,435,843 and 5,565,028 described the activation of Class C fly ash at room temperature with strong alkali (pH>14.69) to yield cementitious properties. Even though there is no express mention of Class F fly ash use in these patents, the cement containing Class C fly ash according to these patents has limited application due to the corrosive properties (pH>14.6) of the used activators.

EPO Patent No. 0858978 discloses that high volumes of activated Class C Fly ash (>90%) may be used as a cementitious binder. The binder contains a mix of Class C and Class F Fly ashes wherein the dosage of Class F fly ash has to be limited up to 60% due to its low reactivity. In this case, Class F Fly ash is mentioned but it is used together with clinker and admixtures like citric acid, borax, Boric acid, which are very expensive, and KOH, which is corrosive (pH>13). Furthermore, formulations get complex because the high number (>6) of presented components.

In a similar way, U.S. Pat. No. 5,482,549 describes a cement mixture containing at least 2% by weight of Portland cement clinker, 2-12% by weight of sodium silicate, fly ash and blast furnace slag. The patent specifies that the fly ash has to be ground to a specific surface of more than 500 square meters per kg which is very important and yields high manufacturing costs (energy consumption, handling, etc.). Furthermore, this document doesn't mention the use of Class F fly ash.

Xu et al., "The activation of Class C-, Class F-Fly Ash and Blast Furnace Slag Using Geopolymerisation", 8th CANMET/ACI International Conference on Fly Ash, Silica Fume, Slag and natural Pozzolans in Concrete, Las Vegas, Calif., USA (2004), shows that Class F fly ash can only be properly activated when using a highly alkaline soluble silicate solution. Following this line, U.S. Pat. No. 5,601,643 proposes an invention related with chemically-activated fly ash cementitious materials, preferably Class F Fly ash, where high content of alkali metal and/or alkaline earth metal silicate are used to obtain high strength cementitious mixtures. However, this invention has a limited application because: 1) a high curing temperature is need, 2) a high pH (>14, corrosive products) is required and therefore, safety conditions are necessary to handle the mixture and 3) the cost of the mixture is high due to the high quantities of soluble silicates and alkalis used. Furthermore, formulations related with high alkalis content and high pH cause alkali-leaching problems and efflorescence due to the overdose of activators. The overdose of activators is due to Class F fly ash that is considered as a binder and not as active filler, which requires less alkaline dosage for being activated.

Skvara et al. (Ceramics Slicaty 43-1999) described alkali activated mixtures of slag and fly ash using sodium silicates and sodium hydroxides at high dosages (SiO$_2$/Na$_2$O located from 0.6 to 1.6) on pastes. PCT patent publication no. WO 2005/09770 discloses alkali activated mixtures of slag and fly ash in the form of pastes using gypsum additions in the anhydrite form and superplasticizers to achieve significant strength development. Most if not all of these studies present results based on pastes (sometimes on standard mortars) with limited or no industrial interest and most of the time very high costs.

The activation of the various latent pozzolanic materials (e.g. slag, clay, fly ashes, flues, natural pozzolan) is described using various sources of alkalis salts (silicates, carbonates, hydroxides) but most of the time, the respective amounts of the alkali sources is not detailed. However, experience has shown, that the source of the alkali for activation plays an important role and that any combination does not provide the same results. Finally, optimizing the quantity and the source of the chemical activator is highly relevant in order to control the cost of the final concrete product. Furthermore, most of the publications emphasize that curing of these pastes should occur at elevated temperatures (above 40° C.) or need a preliminary heat treatment for some hours at temperatures located between 60° C. and 100° C. Considering real industrial construction material poses other problems than trying to activate latent hydraulic material to develop some strength in pastes.

For concrete applications, using conventional amounts of sand and aggregates, the problem is different since workability and strength development mechanisms are clearly affected by the aggregates and the industrial mixing conditions. Therefore, the invention intends to describe new industrial construction materials, mainly concrete mix designs that can be used in many structural applications (ready mix, pre-cast). The invention consists in providing an alternative to conventional Portland cement based concrete. Furthermore, the content and the nature of the chemical activators have to be optimized in order to enable effective strength development, cost effective final concrete and to avoid leaching and lixiviation problems related to unreacted excess chemical activators.

The aim of the invention is to remedy to the above drawback by providing industrially applicable concrete compositions with the following advantages:

environmental friendly;
easy to formulate involving limited number of components;
safe and easy to handle and to prepare with conventional equipment;
cost effective;
controlled workability without additions of organic superplasticizers;
ability to be prepared on the construction site; and
no specific curing conditions.

Typically, the invention doesn't aim to use any cement or cement related compounds (like cement kiln dusts for instance). The advantage not to use cement in the formulation of the binder is mainly based on the objective of simplicity and polyvalence of the invention. Cement or the like additions in the formulation will lead to additional problems of interactions with the chemical activators that need to circumvent by further specific chemicals etc, special curing conditions, etc. The objective of early strength development, as well as the universal property of the binder will be very difficult to achieve. Finally, the ecological advantages of the product according to the invention will be reduced since cement, clinker or cement kiln dust additions are correlated to additional $CO_2$ emissions. It will be seen in the following description that none of the prior art present the technical features and none of the prior art have all advantages provided by the present invention.

SUMMARY OF THE INVENTION

A construction material is based on a simple formulation that is easy to produce at room temperature and to operate, following a robustness process, with similar or better properties (rheology, mechanical strength, durability etc.) than ordinary Portland cement (OPC), and covering a wide scope of applications in various fields, preferably for ready-mix concrete. Therefore, the aim of the invention is to provide a low cost and simple multipurpose industrial construction material, namely a range of concrete mix designs, including, sand, fine and coarse aggregates, material made from activated residues: high volumes of Class F fly ash (>50%), small quantities of Blast Furnace Slag (<40%) and very small quantities of industrially available alkaline carbonate ($R_2CO_3$), alkaline silicate $R_2O$ $(n)SiO_2$, and a booster, typically any strong base that is used to set and control the pH. A further aim of the invention is to provide an industrial construction material, more specifically concrete mix designs using conventional aggregates, that develops strength over time (e.g. after 2, 7 or 28 days) in a similar way that concrete based on ordinary Portland cement (EN classes C30, C40, C50, etc.) at conventional curing temperatures (22° C.+/−2° C.). A further aim of the invention is to provide a set of concrete mix designs, which fabrication costs are optimized, and complying with the industrial requirements of a standard concrete based on ordinary Portland cement.

An important advantage of the invention is that it provides a very robust product and process, which is not sensitive over chemical composition variations of the industrial wastes (fly ash type F and blast furnace slag). Thus, the expected mechanical resistance requirements are always achieved. Another advantage of the invention is that the new construction material is provided with a good workability (measured using the ASTM C143 Abraham's cone test) at low water binder ratio to enable a good strength development.

Ecological advantages are present with this invention because it is a friendly cementitious binder made from residues, with limited indirect $CO_2$ emissions and with low energy consumption during its production. Furthermore, the alkali leachability is controlled by correct dosage of activators insuring their combination in the hydration products. Furthermore, the water to binder ratio and other optimized parameters of the concrete have been selected in order to provide good workability (e.g. Abrahams cone larger than 5 cm or larger than 15 cm to obtain so called super fluid concretes) together with an acceptable strength development under conventional curing temperature (room temperature).

Moreover, the various chemical components that enter the chemical activator have to be designed carefully to optimized the cost of the activator (largest cost contributor to the cubic meter of concrete). Finally, the binder content of the concrete and the water to binder ratio are also very important parameters to control the cost of the cubic meter of produced concrete. Other advantages will appear in the following detailed description, where the invention will be better understood based on exemplary embodiments and comparative examples by means of the following tables and figures.

BRIEF DESCRIPTION OF DRAWINGS

FIG. 1 shows typical chemical composition of respectively class F fly ash and blast furnace slag used to make the binder according to the present invention;

FIG. 2 shows some representative typical properties of respectively class F fly ash and blast furnace slag used to make the binder according to the present invention;

FIG. 3 shows the mineralogical composition obtained by X-Ray diffraction of the Class F Fly ash and blast furnace slag used to make the binder composition according to the present invention;

FIG. 4 shows some examples of concrete mix designs using conventional aggregates sieve line. Compressive strength on EN cubes (15 cm×15 cm×15 cm) are given at 2, 7 and 28 days after curing at 22°+/−2° C.

DETAILED DESCRIPTION

Figure 5:
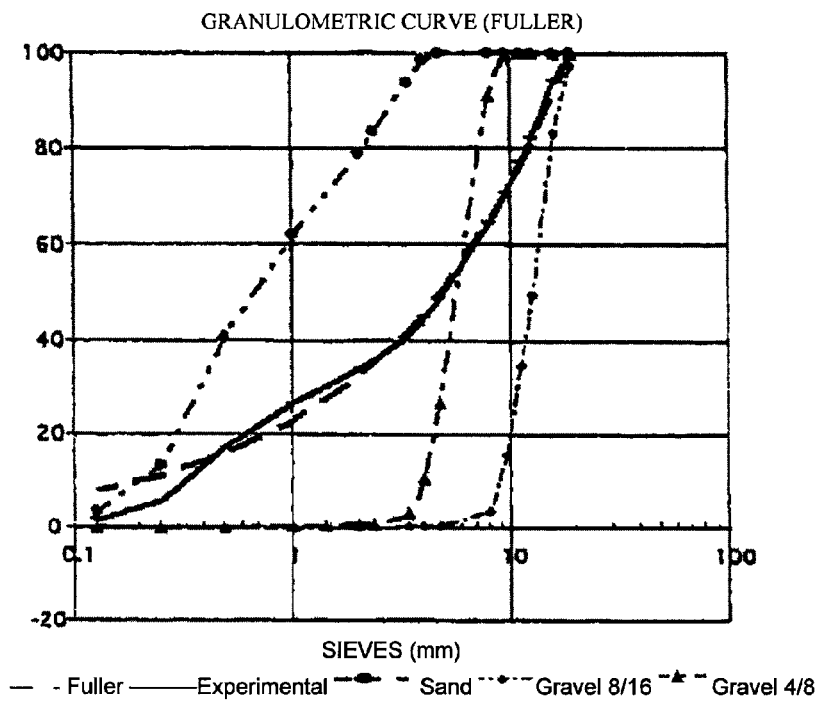
FIGS. 5 and 6 show a typical aggregates sieve line curve used for the concrete testing.

The binder according to the invention is manufactured from fly ash, blast furnace slag and chemical activators. The dry hydraulic binder (including the fly ash, the slag and all chemical activators) according to the invention comprises:

fly ash containing less than 8% w/w of CaO: 55-80% by weight;

blast furnace slag: 15%-40% by weight; and a chemical activator containing:

from 0.8 to 4 wt. % of alkaline silicates expressed as $SiO_2$; and from 2 to 9 wt. % of alkaline carbonates expressed as R2O.

The chemical activator is a mix of alkali silicate and alkali carbonates (Na, K or Li). Advantageously, the fly ash is pure class F fly ash.

Fly ash is the main component of the binder. Fly ashes are mainly composed by aluminosilicates partially vitrified, as well as mineral phases such as quartz, hematite, magnetite, anhydrite and so on which had been present as impurities in the original coal. Class F fly ash contains more than 70% of silica, alumina and ferric oxide and typically less than 8% of calcium oxide.

Table 1 presents the typical chemical composition, obtained by X-Ray fluorescence, of class F fly ash (FAF) used in the scope of this invention. Table 1 shows that the fly ash composition matches the requirements of a type F fly ash, with a CaO content of less than 8%. The chemical composition presented in the table of FIG. 1 only represents an example and the present invention is not limited to the chemical composition of FIG. 1. Class F fly ash is mainly a finely dispersed material, with a specific surface of 250 to 350 square meter per kg. In order to limit the energy consumption and reduce the manufacturing price of the binder, the fly ash type F does not require any pre-milling process. The table of FIG. 2 also presents some other typical but not limiting properties of the ground BFS used in the frame of the invention.

FIG. 3 presents a typical X-Ray diffraction pattern performed on a FAF. It can be observed that the product is partially crystalline. The principal mineral phases found in the FAF are described with the following nomenclature: M-Mullite (alumino-silicates) O-Quartz and MG-Maghemite (iron oxide). On FIG. 3 it can also be observed the fact that the bulk material FAF also contains one or more amorphous (glassy) phases, which represents 50-60% by weight. The glassy phases, characterized by the halo presented in the background of FIG. 3 ($\cong$19-32 sin 2$\Theta$), are mainly constituted of aluminosilicates.

The second component of the binder is blast furnace flag (BFS). BFS is a highly impure calcium alumina-silicate glass that is a by-product from the pig iron production. BFS is typically used in the cement industry as a pozzolanic material in addition to Portland clinker and in the concrete industry as an addition to the cement portion.

FIG. 1 presents the typical chemical composition of the BFS used in the scope of this invention. The chemical composition is classically obtained by X-Ray fluorescence. The chemical composition presented in FIG. 1 only consists in an example and the present invention is not limited to the chemical composition of FIG. 1. FIG. 2 also presents some other typical but not limiting properties of the ground BFS used in the frame of the invention.

FIG. 3 shows a typical X-Ray diffraction pattern performed on a BFS. It can be observed that the product is mainly amorphous. The amorphous content of the BFS is typically higher than 90% in weight. FIG. 2 also presents some other typical but not limiting properties of the ground BFS used in the frame of the invention.

The BFS comes in the form of a granulated medium with a very low specific surface. The size of the individual particles varies from some millimeters to some centimeters. Therefore, the BFS has to be ground using a conventional industrial mill (bar mill, ball mill) in order to obtain a specific surface from 350 to 550 square meters per kilogram. This operation is very conventional in the cement and concrete industry. Thus, unlike some other binders of the prior art, the binder used in this invention according to the present invention does not require special grinding or milling operation to increase the specific surface to very high values (over 650 square meters per Kg).

It has to be stated here that the milling energy varies exponentially with the fineness. Thus, requirements for high specific surface yield enormous production costs in energy and in milling capacity of the industrial mills since the duration of the milling has to be drastic to reach elevated fineness. The present invention does not require specific BFS grinding operations and complies with the values that are conventional for cement industry (350 to 550 square meters per Kg). As a consequence, the invention makes it possible to use ground BFS from a normal milling terminal, yielding no additional costs. Typically, two different finenesses of slag were used characterized by a specific surface of respectively around 400 square meters per Kg (Blaine 4000) and around 500 square meters per Kg (Blaine 5000).

The chemical activator is designed to provide the main source of alkalis for the alkali activation reaction with the fly ash and the slag. Unlike other binders of the prior art, the chemical activator contains 2 main sources of alkalis: alkaline silicates and alkaline carbonates. In order to meet the objective of cost reduction, Sodium will be the preferred selected alkali according to a first embodiment, but it is clear that lithium and/or potassium can advantageously replace or partially substitutes the sodium for some applications. The respective dosage of these alkalis sources is performed to optimize the costs of the activator, to enable targeted strength development and workability of the final concrete as will be shown in the examples.

The sodium carbonate, also called soda ash and the sodium silicate are commercially available in large industrial quantities and exist in solid form (powders) and in liquid form. Alkaline carbonates and silicic salts type, $R_2O$ (n)$SiO_2$, called alkaline silicate, where R is an alkaline ion from Na, K or Li are the activators. Advantageously, the silica to alkali molar ratio of the activator is located between 0.1 and 0.55. Although alkali silicates present the advantage to provide a very concentrated alkali source, the selection of the alkali carbonates as activator is motivated by economical reasons since carbonates are cheap, widely available in the form of powdered material.

The chemical activator is aimed to provide the optimized quantity of alkalis and silicates to initiate the reaction with the blast furnace slag and the fly ash to form hydrated gels and later on to enable the inorganic polymerization to develop strength. Excess alkalis or silicates will not take place in the formation of the hydrated products (gels and inorganic polymer) and will remain unbounded, leading to leaching and lixiviation problems in the concrete. The range of silicates to alkalis ratio, as well as the activated content, according to the invention enables to optimize the strength development avoiding silicates or alkalis leaching issues in the final concrete.

For costs and industrial availability reasons, the carbonates used are mainly sodium and potassium carbonates, although Lithium may also be considered. The ratio between sodium and potassium carbonates is one of the parameters that permits to further optimize the early age strength (e.g. strength at 2 days) and a good workability of the concrete mix at given water to binder ratio. Advantageously, the molar ratio of $Na_2O$ to $K_2O$ for the carbonates is located between 0.6 and 7, preferably between 1.7 and 3.5.

The water used for the invention does not require any particular precaution and it can be considered that any water that would be used advantageously for an Ordinary Portland Cement (OPC) can be use without restriction with the binder according to the present invention. The water is added to the construction material in a water to binder ratio located between 0.3 and 0.45. Thus, the water content is sufficient to provide good workability (Abrahams cone values above 5 cm) of the construction material and permits a strength development under conventional curing temperature.

Preferably, all the components of the chemical activators will be diluted into part or all of the water requested to meet the selected water binder ratio to prepare the concrete. Dissolving the chemical activator into the water will typically yield a pH value located between 11 and 12 that is insufficient to fully initiate the reaction in case of concrete application and would not yield industrially acceptable early age strength (e.g. around 10 MPa at 2 days). Furthermore, such a pH value does enable to provide robust industrial concrete mix designs.

Therefore, a booster comprising a least a strong base is used, in small quantity, to set the pH to values typically located between 12.1 and 13.7, preferably between 12.5 and 13.5, depending on the desired properties (strength development and workability). The pH value is set and measured taking into account the overall quantity of water required by the selected water binder ratio of the concrete mix design. The booster comprises a strong base or any strong bases mixes. The strong base may be an organic or an inorganic base and may be chosen among: e.g. hydroxides of Li, Mg, K, Na, Ba, Cs Ca, Sr or organic strong base like butyl lithium or sodium amine. Typically, depending on the desired pH, the design of the chemical activator and the water to binder ratio, the strong base (booster) concentration in the total water comprised in the construction material is located between 0.05 and 2.5 molar. Although the preferred method is to add all the chemical activators and the strong base booster in the entire water needed for the mix design, it is clear that only part of the needed water may contain the chemical activators and the booster whereas some complementary plain water additions may be performed to finally obtain the required amount of water of the mix.

Here, it can be seen that the number of components used in the formulation of the binder according to the invention is very limited and industrially available at low costs. Furthermore, none of the components require any specific pre-treatment and can be used from the conventional manufacturing processes without yielding additional costs.

The aggregates used in the concrete testing are typically described on FIG. 5 and it can be seen that a conventional design of the aggregates size distribution has been used (Fuller-type). Tests were performed on round aggregates (3 fractions with respectively sand 42.7% volume, gravel 4-8 mm 22.3% volume and gravel 8-16 mm 35% volume) and crushed aggregates using for instance 9 fractions to meet the same sieve line (granulometry distribution) as described in FIG. 5. No difference in flow and strength development could be noticed using round (3 fractions) or crushed aggregates (9 fractions) for a given mix design.

In order to provide a construction material that would have the same flexibility and the wide range of applications of an ordinary Portland cement (OPC)-based concrete, it is important not only to focus the attention on the strength that will develop after 28 days but also to consider the strength at the early stage. The resistance after 2 days is in that respect an important value for many applications (pre-cast, slabs, building construction, etc.). Typically, an EN standard concrete based on an ordinary Portland cement (with a content of 350-450 kg per cubic meters of concrete), would yield resistance strength in compression to values from 10-30 MPa after 48 hours at room temperature.

It is one goal of the invention to achieve similar early strength without having to use special curing conditions at elevated temperature (vapor curing, etc.) in order to respect the polyvalence, the flexibility and the low cost of the binder. Unlike other binders described in the prior art, the binder according to the invention does not require any special curing to enable acceptable strength development after 48 hours. It will be shown that the compressive resistance obtained after 2 days using standard curing conditions is identical to the compressive resistance of an ordinary Portland cement in the same conditions.

Figure 6:
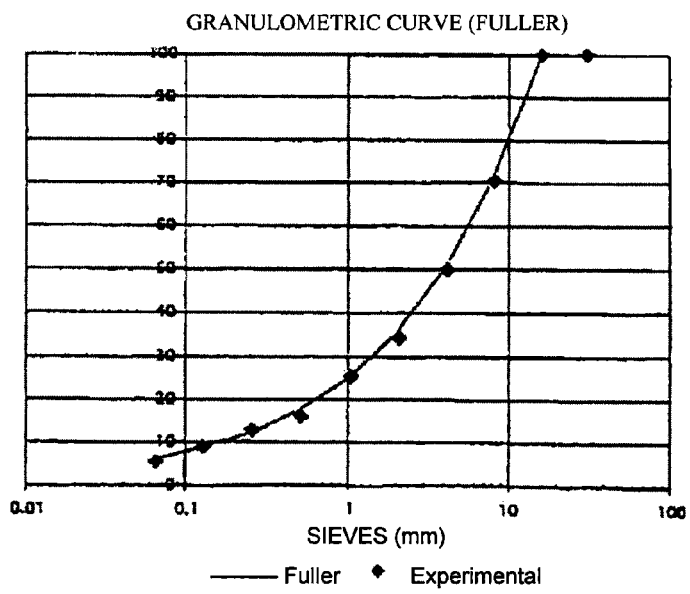

Of course, the invention is not limited to the described components. One can for instance consider alternatives involving for instance the addition of the components by industrial and agricultural residues containing high alkalis or highly reactive amorphous silica. For example, silica fume, rice husk ashes or natural aluminosilicates like volcanic pozzolanes or zeolites can also be added to the binder. We will now describe some applications and mixes. EN concrete test samples (cubes 15 cm×15 cm×15 cm) were prepared using a conventional concrete mixer with aggregates and sand typically described on FIGS. 5 and 6 although it is clear that the invention is not limited to this specific sand and aggregates granulometry. The sand, the aggregates the slag and the fly ash were dry mixed in the concrete mixer and then the water containing the dissolved activator and the strong base booster were added for further mixing.

Various parameters were tested to analyze the flow (Abraham's cone) and the strength development of the mix designs:
the content of the binder (slag+fly ash+chemical activator) from 350 Kg to 600 Kg per cubic meter;
the water to binder ratio from 0.3 to 0.5;
the pH of the water containing the dissolved activator and the base booster from 12.5 to 13.7;
the design of the chemical activator with SiO2/R2O from 0.1 to 0.55;
the design of the chemical activator containing from 0.8-4% weight of alkaline silicates (SiO2) and from 1.5 to 9% weight alkaline carbonates (R2O);
the slag content from 15 weight % to 40 weight % of the total binder; and
the fly ash content from 55% in weight to 80% in weight of the total binder.

Also as mentioned 2 different finenesses were used for the slag, typically around 350-400 square meter per Kg and around 500 square meter per Kg.

FIG. 4 shows typical examples of the strength development of concrete according to the invention at 2, 7, and 28 days using compressive test. Preparation, curing and testing were performed at room temperature in normalized conditions.

The strength development is in accordance to the expectation and mortars present a very good early strength at 2 days and an improved very high resistance at 28 days with respect to ordinary Portland cement.

Controlling and setting the pH with help of the strong base booster is very important to maintain high workability at low water to binder ratio and therefore providing good strength development. For instance, given concrete mixes design (constant constituents and water/binder ratio) will exhibit higher workability when the pH is increased from 12.5 to 13.0 and to 13.5 for instance. According to a second aspect of the invention, we will now describe an optimized method to prepare the concrete according to the invention for concrete, ready mix and pre-cast applications.

The following process enables to further improve the properties of the concrete. According to the invention, the method to produce a concrete construction material comprises the following steps:
  a) In a first mixer, preparing the hardening slurry mixture by homogenisation of the chemical activator, the blast furnace slag, and part or all of the required water;
  b) In a second mixer, preparing an initial dry mix by homogenisation of sand and aggregates (fine and coarse) and class F fly ash; and
  c) Conventional mixing the initial mix b) with the hardening mixture slurry a) and adding the rest water if needed.

The booster may be added during steps a) or b) but is preferably added during step a).

According to a preferred embodiment of the invention, the step of hardening slurry mixture preparation comprises:
  a first step of preparing an activator solution by dissolution of the chemical activator and the booster in all or part of the required water; and
  a second step of mixing the activator solution with the blast furnace slag.

Thus, the method is safer because heat release will occur only during this activator solution preparation step and will not occur during further step. Furthermore, large quantities of activator solution can be prepared in advance. In both cases described hereabove, the strong base booster additions to set the pH of the overall water+chemical activator at a given value between 12.1 and 13.7 are typically but not necessarily added to the activator solution. Adding the booster to activator solution will be favourable to enable the pH measurement using conventional industrial equipment. If the booster is not added to the overall required water, calculations need to be done to take into account the quantity of additional water that has to be added to reach the desired water to binder ratio. Thus, the final mixture can be achieved efficiently since the hardening mixture obtained under a) is very fluid.

According to this method, the overall mixing duration does not exceed the mixing duration of a normal process. Preferably, all the required water will be used during step a) that enables an easier control of the pH. Nevertheless, the process according to the invention includes using partially the required water to dissolve the chemical activator. Finally, a wide range of organic and inorganic admixtures can be added to the formulation if necessary (in a similar way to standard concrete based on OPC) to modify the properties of the concrete (air entrainer, superplastizers, retarders, accelerators, etc.).

The invention claimed is:

1. A construction material, containing sand, fine aggregates, coarse aggregates, water and a binder, the construction material comprising: (a) from 55 to 80 wt. % of fly ash containing less than wt. 8% of CaO; (b) from 15 to 40 wt. % of blast furnace slag; (c) a chemical activator comprising: from 0.8 to 4 wt. % of alkaline silicates; and from 1.5 to 9 wt. % of alkaline carbonates; and wherein the chemical activator has an silica to alkali molar ratio from 0.1 to 0.55; and (d) a booster comprising at least one strong base.

2. A construction material according to claim 1 wherein the binder is mixed with water in a water to binder ratio located between 0.3 and 0.45.

3. A construction material according to claim 1 wherein the booster is arranged to set the pH of the water to values located between 12.1 and 13.7.

4. A construction material according to claim 1 wherein the booster comprises a least one strong base, the molar concentration of the said strong base(s) being located between 0.05 and 2.5 with regard to the water content.

5. A construction material according to claim 1 wherein the strong base(s) is a strong alkali.

6. A construction material according to claim 1 wherein the fly ash is pure class F fly ash.

7. A construction material according to claim 1 wherein fly ash has a specific surface from 200 to 500 square meters per Kg.

8. A construction material according to claim 1 wherein blast furnace slag has a specific surface from 350 to 600 square meters per Kg.

9. A construction material according to claim 1 wherein the binder content is located between 350 kg and 600 Kg per cubic meter of the construction material.

10. A construction material according to claim 1 comprising industrial or agricultural residues containing amorphous silica.

11. A method to produce a concrete construction material, containing sand, fine aggregates, coarse aggregates, water and a binder, the construction material comprising:
  (i) from 55 to 80 wt. % of fly ash containing less than wt. 8% of CaO;
  (ii) from 15 to 40 wt. % of blast furnace slag; and
  (iii) a chemical activator comprising:
    from 0.8 to 4 wt. % of alkaline silicates; and
    from 1.5 to 9 wt. % of alkaline carbonates,
    wherein the chemical activator has an silica to alkali molar ratio from 0.1 to 0.55;
  (iv) a booster comprising at least one strong base comprising the following steps:
  a) preparing an activator slurry by dissolution of the chemical activator, the blast furnace slag in all or part of the required water;
  b) preparing an initial dry mix by homogenisation of sand fine and coarse aggregates, and class F fly ash;
  c) adding the activated solution a) and the remaining water to the dry mix b) and mixing the concrete; and
  d) adding the booster during steps a) or b).

12. A method to produce a concrete construction material according to claim 11, wherein the booster is added in order to reach a pH located between 12.1 and 13.7.

13. A method to produce a concrete construction material according to claim 12, further comprising a step of measuring the pH and a step of setting the pH with booster addition.

* * * * *